April 24, 1962 L. A. JOHNSON ETAL 3,031,590

CONTROL MECHANISM FOR PROVIDING A SELECTED ONE OF A PLURALITY OF SELECTABLE PROGRAMS OF OPERATIONS

Filed June 11, 1959 3 Sheets-Sheet 1

INVENTORS
LESLIE A. JOHNSON
WESLEY E. SHREFFLER
BY Ralph T. French
ATTORNEY

INVENTORS
LESLIE A. JOHNSON
WESLEY E. SHREFFLER
BY Ralph T. French
ATTORNEY

United States Patent Office 3,031,590 Patented Apr. 24, 1962

3,031,590

CONTROL MECHANISM FOR PROVIDING A SELECTED ONE OF A PLURALITY OF SELECTABLE PROGRAMS OF OPERATIONS

Leslie A. Johnson and Wesley E. Shreffler, Mansfield, Ohio, assignors to Westinghouse Electric Corporation, East Pittsburgh, Pa., a corporation of Pennsylvania Filed June 11, 1959, Ser. No. 819,767
4 Claims. (Cl. 307—141)

This invention relates to control mechanism for apparatus, such as an automatic clothes washer or dryer, having a plurality of electrical devices which are operated in sequence, and it has for an object to provide improved control mechanism of this type.

Another object of the invention is to facilitate selection of a desired sequence of operations of a plurality of electrical devices.

While control mechanism incorporating the present invention has widespread application in all fields involving selection of one of a plurality of programs of operations of electrical devices, it is ideally suited for use in controlling domestic laundry equipment, for example, home clothes washers and clothes dryers, and it is hereinafter shown and described, by way of example, in connection with a home clothes washer.

In accordance with the present invention, the control apparatus for a piece of laundry equipment or the like includes a timer that effects all of the various treatments that may be desired in a plurality of programs of treatments, the timer effecting these various treatments by opening and closing electrical circuits to the electrical devices which actuate the mechanisms that perform the treatments. A bank of switches is included in the timer mechanism, with each switch controlling one of the circuits. Each switch is spring-biased to one position, which may be either open or closed, and has a cam follower by which it is moved to the other position. The cam followers are arranged side by side in a row or bank, and are operated by corresponding cam elements formed in side-by-side rows on a face of a rigid program card.

A separate program card is provided for each of the different programs of treatments, the arrangement of the cam elements varying from card to card as required by the variations in treatments afforded by the different programs.

A rack supports the selected program card for movement past the bank of switches and cam followers, with the cams of the card actuating the appropriate switches. A gear, driven by the timer motor, meshes with a row of teeth on the card to advance the latter past the bank of switches.

The card-holding rack is mounted for limited movement between a non-operating position where the card cams are out of engagement with the cam followers and the card teeth are disengaged from the driving gear, and an operating position where the cams engage the followers and the card and gear teeth are meshed. Manually-operable means is provided for moving the rack from its non-operating position to its operating position and simultaneously closing a line switch to initiate a program of treatments. Spring means, held inactive by a latch, automatically returns the rack to its non-operating position and opens the line switch, when the latch is tripped by the card, as the latter reaches the end of its travel past the switches.

The foregoing and other objects are effected by the invention as will be apparent from the following description and claims taken in connection with the accompanying drawings, forming a part of this application, in which:

Figures 1, 2, 3, 4:
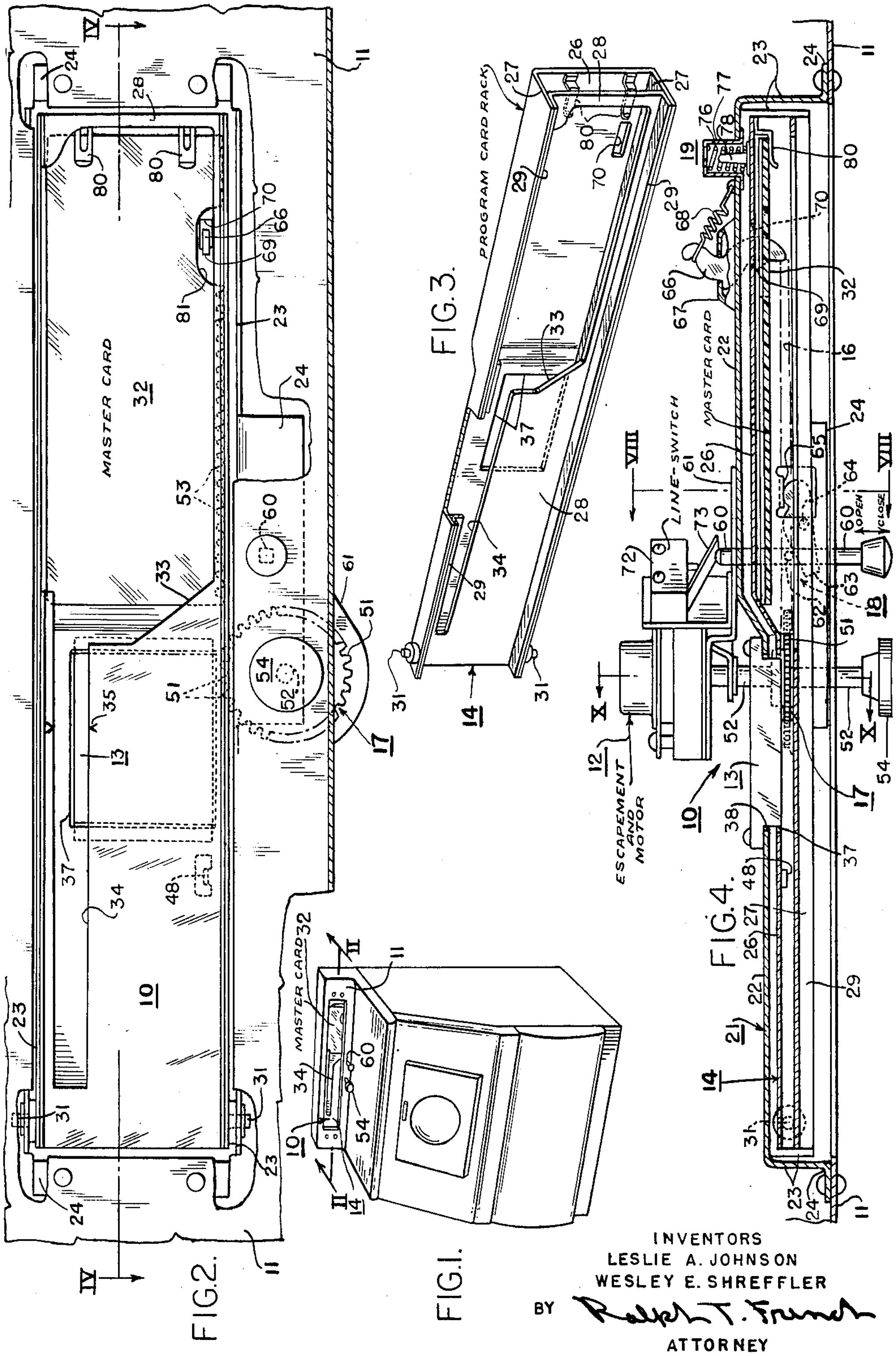
FIG. 1 is a perspective view of a domestic clothes washer incorporating an automatic control constructed in accordance with the present invention.
FIG. 2 is a sectional view, taken along the line II—II of FIG. 1, looking in the direction indicated by the arrows, and showing the clothes washer back-splash panel housing the novel control mechanism, in elevation.
FIG. 3 is a perspective view of the rack for supporting a selected program card.
FIG. 4 is a horizontal sectional view, taken along the line IV—IV of FIG. 2, looking in the direction indicated by the arrows, and showing the program card rack in closed, or operating, position.

Referring now to the drawings in greater detail, there is shown in FIG. 1, by way of illustration, a clothes washer of the domestic type, adapted to provide a variety of different programs of fabric treatments, and incorporating novel control apparatus 10 constructed in accordance with the present invention and housed in the backsplash panel 11 of the clothes washer. Of course, the control may be located elsewhere on the washer, or remote therefrom.

Basically, the novel control apparatus 10 includes a timer motor and escapement mechanism 12, a bank 13 of switches for energizing circuits to a plurality of electrically operated devices (not shown), a rack 14 for supporting a selected program card 16 which operates the proper switches to effect the desired program of fabric treatments, card advancing mechanism 17 for moving the program card 16 past the bank of switches 13, a manually-operable rack-actuating mechanism 18 for moving the rack rearwardly from non-operating position to operating position, and rack-actuating mechanism 19 for automatically moving the rack forwardly to non-operative position upon completion of the selected program of fabric treatments.

The above elements and mechanisms are carried by supporting structure 21 (FIGS. 4, 5 and 8), having a rear wall 22 and four side walls 23, cooperating to define a recess for reception of the program card rack 14. The supporting structure side walls 23 include flanges 24 by which the supporting structure is secured against the rear surface of the backsplash panel 11. The backsplash panel 11 has an opening therethrough exposing and rendering accessible substantially the entire interior of the recess defined by the supporting structure.

Figures 5, 6, 7, 8, 9:
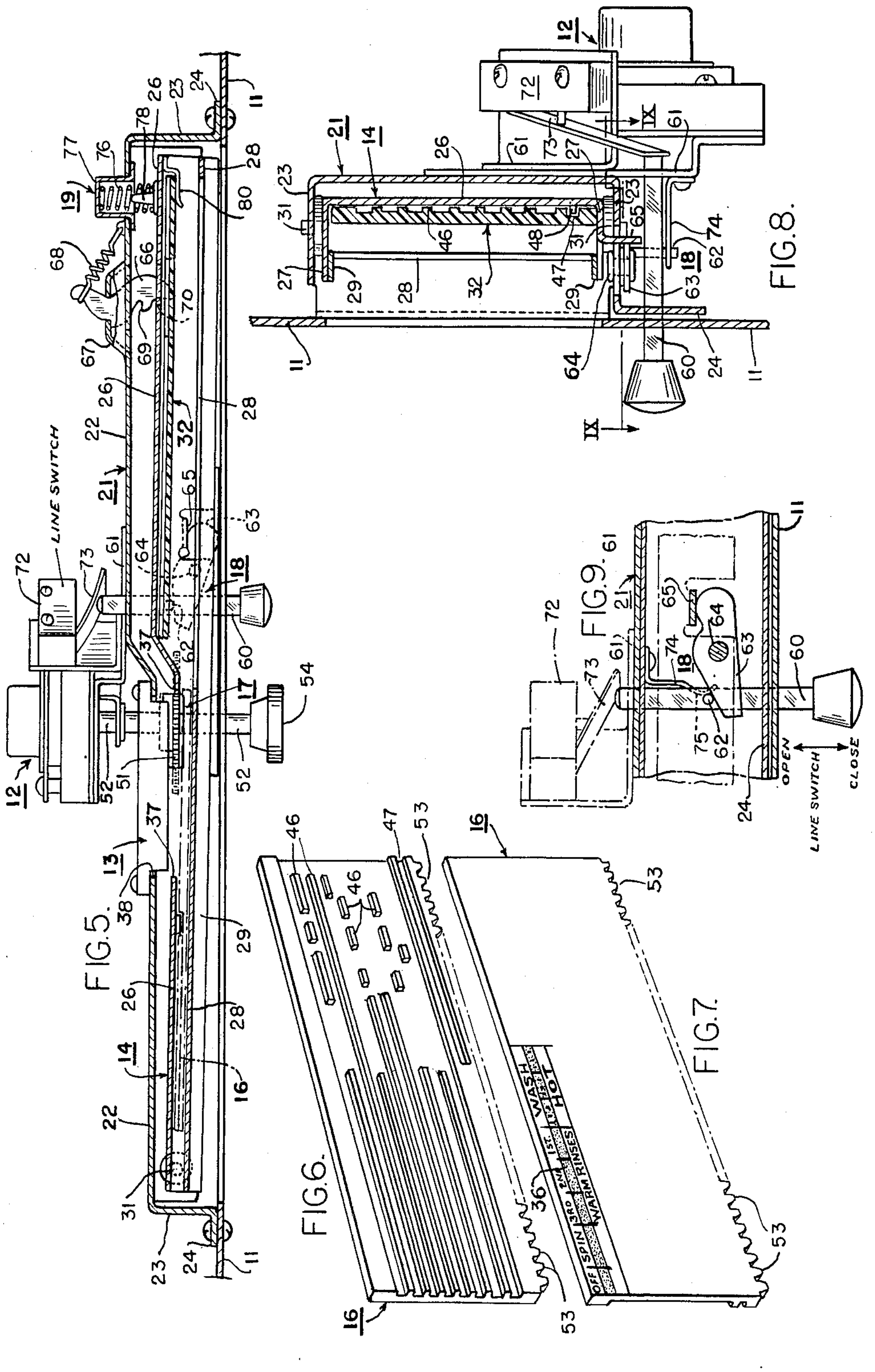
FIG. 5 is a horizontal sectional view similar to FIG. 4, showing the program card rack in open, or inoperative, position.
FIGS. 6 and 7 are rear and front perspective views, respectively, of a typical program card for use in the control apparatus of the invention.
FIG. 8 is a vertical sectional view, taken along the line VIII—VIII of FIG. 4, looking in the direction indicated by the arrows.
FIG. 9 is a horizontal sectional view, taken along the line IX—IX of FIG. 8, looking in the direction indicated by the arrows.

The rack 14, which supports and houses the selected program card 16, includes a rear wall 26 having top and bottom horizontal flanges 27, and a front wall 28 having similar top and bottom horizontal flanges 29. As clearly shown in FIGS. 3 and 8, the front wall 28, with its flanges 29, fits closely between the flanges 27 of the rear wall 26 and is permanently secured thereto by any suitable means, for example, by welding. The rack 14 is pivotally mounted, as at 31, adjacent its left-hand end, as viewed in FIGS. 2, 3, 4 and 5, for limited pivotal movement about a vertical axis within the recess defined by the supporting structure 21. As shown in FIGS. 4 and 5, the spacing of the front and rear walls of the rack is sufficient, in the left-hand portion thereof, for reception of a single program card 16, while at the right-hand portion thereof the spacing is sufficient to permit permanent housing of a master program card 32, the rear wall 26 being set back, in the right-hand half of the rack, relative to the rear wall of the remaining portion of the rack.

Figure 12:
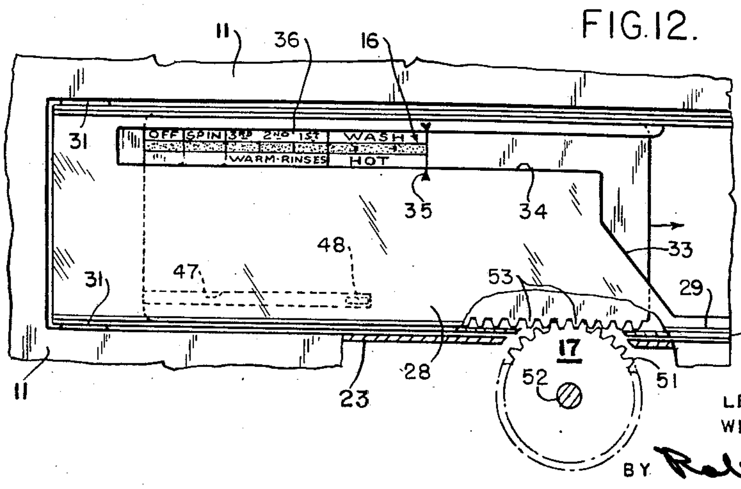

As shown in FIGS. 2, 3 and 12, the front wall 28 of the rack is provided, in its right-hand portion, with a relatively large opening 33 through which any selected card 16 may be inserted into the rack. This opening 33 has an extension 34, which is relatively long and narrow, and extends most of the length of the left-hand half of the rack. As indicated in FIG. 12, this slot 34 renders visible to the operator a series of indicia 36, provided near the upper edge of the front of each program card 16, for cooperation with a fixed reference mark 35 on the rack front wall 28. As the card is moved past the mark 35, during a clothes treatment program, the treatment being performed at any instant is shown, as well as the extent of progress in the particular treatment.

The rear wall 26 of the rack is provided with a rectangular opening 37, aligned with a similar opening 38 in the rear wall 22 of the supporting structure 21. These aligned openings 37 and 38 receive the bank 13 of switches which control circuits to the various electrical devices controlled by the timer mechanism.

Figures 10, 11:
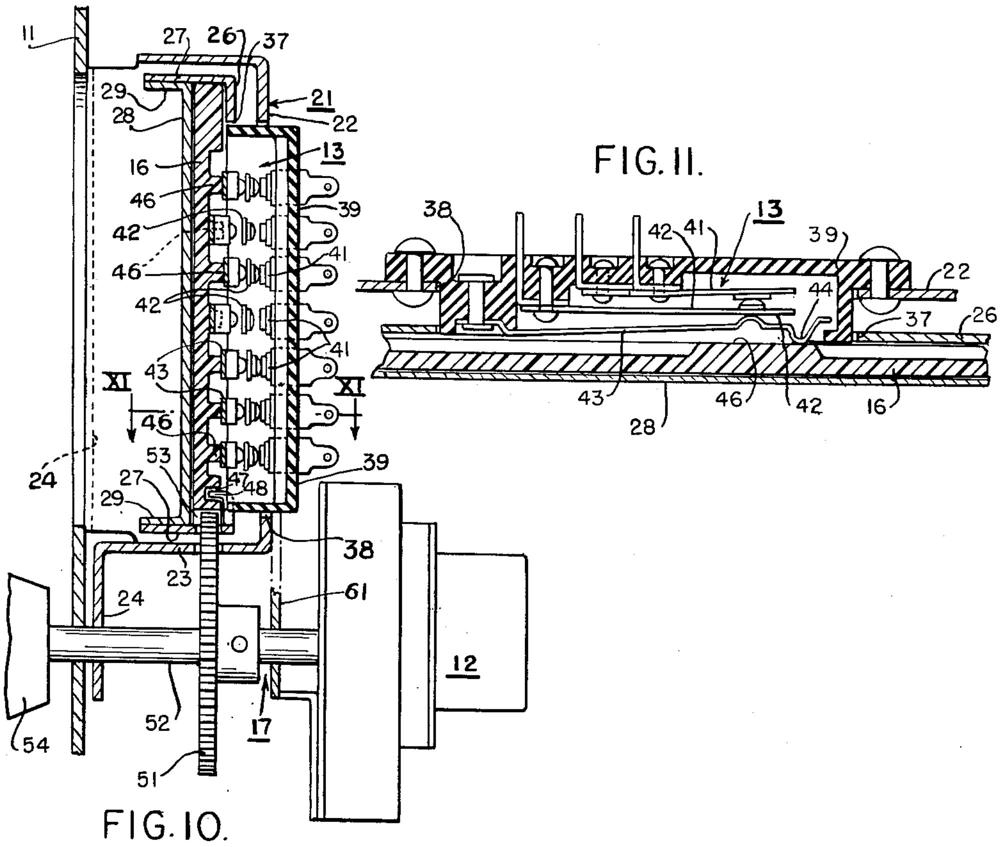
FIG. 10 is an enlarged vertical sectional view, taken along the line X—X of FIG. 4, looking in the direction indicated by the arrows.
FIG. 11 is a fragmentary horizontal sectional view taken along the line XI—XI of FIG. 10, looking in the direction indicated by the arrows; and, FIG. 12 is an enlarged front elevational view of the left-hand portion of the control, showing a selected program card in operative position at the start of a program of fabric treatments.

As best shown in FIGS. 10 and 11, the bank of switches is contained in a housing 39, suitably secured to the rear surface of the supporting structure rear wall 22, with a portion of the housing extending through the wall 22 and terminating flush with the inner surface of the rack rear wall 26, when the latter is in operating position. In the construction herein illustrated, each of the switches in the bank 13 includes resilient contact arms 41 and 42 carrying cooperating contact elements, the resiliency of the arms 41 and 42 being such that the contacts are normally separated. A resilient cam follower arm 43 overlies each pair of contact arms and has a cam follower 44, formed integral therewith and normally projecting into the space between the rack front and rear walls 26 and 28, respectively, for engagement by the cams 46 provided on the rear surface of the program cards 16.

Referring to FIGS. 6 and 7, it will be noted that each program card 16 carries seven ribs or rows of cams 46, the cards when originally molded of suitable plastic material either having the individual cams molded or being formed with continuous ribs which are later cut away at areas corresponding to periods of the fabric treatment program where a particular electrical device operated by any particular cam or row is to be inoperative. Each program card is provided, in its rear surface near the lower edge of the card, with an elongated slot 47, the longitudinal extent of which determines the position of the card in the rack 14. To this end, the rack 14 has a card positioning lug or stop 48, deformed from the material of the rear wall 26 and projecting into the space between the front and rear walls of the rack, for reception in the slot 47 provided in the rear surface of the card. When the card is assembled in the rack, it is slid to the left as far as possible, the extent of such movement to the left being limited by engagement of the positioning lug 48 with the inner end of the slot 47. Thus, different program cards, which provide for programs of different lengths, will be provided with slots 47 of correspondingly different lengths.

In order for the card cams 46 to operate the bank of switches through the cam followers 44, the card must be moved progressively from left to right, as viewed in the various figures, and to this end, the card-advancing mechanism 17 includes a spur gear 51, fixed on a shaft 52 driven by the timer motor and escapement mechanism 12. The shaft 52 and the gear 51 are so disposed with respect to the rack 14 and any card 16 positioned therein, that the teeth of the gear will mesh with mating teeth 53 provided along the lower edge of the card 16 (FIGS. 10 and 12) when the rack is in the operating position.

In laundry equipment timer mechanism, it is customary to include escapement mechanism which, instead of providing for continuous advancement of timer cams with respect to timer switches, effects intermittent advancement thereof. For example, in one program of fabric treatment, the escapement may provide sixty intermittent advancements of the timer mechanism with one advancement occurring every forty-five seconds. Usually, a plurality of these forty-five second increments of timer advancement are utilized for each step or treatment of the process. For example, the washing period may be scheduled for nine minutes and each rinse may be scheduled for three minutes. Inasmuch as there may be times when the user will want to shorten any of these periods, it is desirable to permit the user to manually advance the timer mechanism to shorten any period of treatment, as desired. To this end, the shaft 52, which carries the spur gear 51, is provided with a manually operable knob 54, by which the shaft and gear may be rotated by the user to advance the card 16, which controls operation of the timer switches, to shorten any period or periods of the selected program, as desired.

The rack-actuating mechanism 18 includes a manually operable push-pull rod 60, supported for limited reciprocal movement in a front-to-rear direction relative to the control mechanism and the rack, by the supporting structure side wall flange 24 and by a supporting bracket 61, depending from the supporting structure rear wall 21. As best shown in FIGS. 8 and 9, the push-pull rod 60 carries a vertically-extending pin 62, adapted to engage the rear edge of one end portion of a lever 63, which is pivotally supported intermediate its terminal portions on a vertical pin 64. The other terminal portion of the lever 63 is adapted to engage a tab 65 depending from the rack 14. It will be apparent, from consideration of the showing of FIG. 9, that as the rod 60 is pulled forwardly, the lever 63 will be rotated counterclockwise and the rack 14 will be moved rearwardly to its operating position, shown in FIG. 4.

The rack is retained in its operating position by a latch 66, which pivots about its point of engagement with a deformed wall portion 67, projecting rearwardly from the supporting structure rear wall 22. The latch 66 is biased to latching position by a tension spring 68, secured to a rearwardly-projecting portion of the latch. The forwardly-extending portion of the latch 66 carries a finger 69 which, when the rack is in operating position, engages in front of the rack rear wall 26 to hold the rack in its operating position. The rear wall 26 is provided with an opening 70 (FIG. 2), through which the forward portion of the latch 66 extends when the rack is in operating position.

The control apparatus 10 includes the usual line switch, herein indicated at 72, this switch being moved to closed position by the resilient arm 73 when the latter is free of restraint. However, as clearly shown in FIG. 5, when the rack is in non-operating position, the rear end of the push-pull rod engages the resilient arm 73 and holds the line switch open. When the push-pull rod 60 is moved forwardly, the resilient arm 73 is permitted to likewise move forward, by its inherent resiliency, to a position where the line switch 72 is closed. Thus, it will be apparent that, by a single movement of the push-pull rod 60 by the user, the rack is moved to operating position and the line switch is simultaneously closed, thereby placing the mechanism in operation, assuming that a suitable program card has been placed in the rack.

It will be noted, from the showing in FIG. 9, that a resilient arm 74 extends forwardly approximately parallel to the push-pull rod 60 and carries, near its free end, a detent 75 adapted, in the position shown for the rod 60, to hold the latter in its forward or switch-closing position. However, if it is desired to open the line switch without moving the rack 14 to non-operating position, the push-pull rod may be pushed to the rear to switch-opening position, the rod being held in this position by engagement of the pin 62 at the rear side of the detent 75.

The rack-actuating mechanism 19, for moving the rack to non-operating position upon completion of a selected program of fabric treatment, comprises a compression spring 76, partially housed in a socket 77, provided at the rear of the supporting structure 21 (FIGS. 4 and 5) and having its forward portion held against displacement by a guide pin 78, carried by the rear wall 26 of the rack. As a program reaches its end, the program card 16 will engage the forward end of the latch 66 (FIG. 4) and pivot the latter counterclockwise until the finger 69 of the latch is disengaged from the rear wall 26 of the rack 14, whereupon the compression spring 76 will force the rack forwardly to non-operating position.

Referring to FIG. 9, it will be apparent that, as the rack is moved forwardly to its non-operating position, the tab 65 of the rack will engage the lever 63 and turn it clockwise, with the result that the opposite end of the lever will force the push-pull rod 60 rearwardly to open the line switch 72, thereby shutting off all current to the timer mechanism and to the electrical devices controlled thereby.

*Operation*

Normally, laundry apparatus provided with a control constructed in accordance with the present invention would come equipped with a set of program cards 16, each card providing for a different program of clothes treatments, with the arrangement of the cams 46 of each card varying with the various treatments. It will be noted that on the card 16, illustrated in FIG. 7, the program provides first for a wash with hot water, followed by three rinses in warm water, and concluding with a spin, during which the vitiated water is removed from the clothes by centrifugal action.

In operation, the card providing the desired program of clothes treatment is inserted into the rack through the rack opening 33, provided in the right-hand half of its front wall, and then slid manually to the left as far as permitted by engagement of the positioning lug 48 with the inner end of the recess 47, provided in the rear surface of the card 16.

The operator will then pull the push-pull rod 60 forward, whereupon the lever 63 will be pivoted counterclockwise, as viewed in the drawings, to move the rack rearwardly to operating position, the latch 66 serving to retain the rack in this position throughout the selected program. At the same time that movement of the push-pull rod forwardly actuates the rack to operating position, it also closes the line switch 72. Closing of the line switch energizes the timer motor and escapement 12, and rotation of the timer escapement shaft 52 advances the card from left to right, through the drive provided by the spur gear 51 and the row of teeth 53 at the bottom of the card.

In this connection, it may be noted that when the rack is in its non-operating position, and the card is slid to the left, the teeth 53 of the card will be in front of, and out of alignment with, the teeth of the spur gear 51, so that the card may be positioned without interference of the card teeth and gear teeth. Pivotal movement of the rack from non-operating to operating position meshes the rack teeth with the gear teeth. Smooth meshing of the rack and gear teeth may be effected in any suitable manner, the particular means utilized not being critical to the present invention. The teeth may be tapered at their adjacent sides, or the escapement mechanism and the depth of the card locating slot may be correlated to insure meshing.

As the card 16 is progressively advanced from left to right, its cams 46 will engage corresponding cam followers 44 to close appropriate switches in the bank 13, thereby closing circuits to energize suitable electrical devices; such as solenoid-operated hot and cold water valves, solenoid-operated drain valve, main basket rotating motor, pump motor or solenoid, etc.

When the card reaches the end of its progressive travel from left to right, its right-hand end will engage the forward terminal portion of the latch 66, thereby turning the latter counterclockwise until its finger 69 is disengaged from the rear wall of the rack, whereupon the compression spring 76 will move the rack forwardly to non-operating position and the depending lug 65 of the rack will swing the lever 63 clockwise to move the push-pull rod 60 rearwardly, thereby opening the line switch 72 and shutting off all electrical power to the control apparatus and to the devices controlled thereby. Thereafter, the card may be pushed to the left again to provide the same program of treatments for a new batch of clothes, or may be removed from the rack and stored elsewhere.

It is appreciated that in some homes, the supply of program cards furnished with the control apparatus may eventually be lost or damaged, if played with by children, in which event the time will arrive when the housewife will find she has no program card with which to operate the control. The present invention takes care of this situation by providing a master card 32, permanently housed in the rack 14. This master card is normally retained in the right-hand half of the rack, where the front-to-rear depth is sufficient to contain the master card without interfering with insertion and removal of other cards previously described. The master card is preferably longer than the other cards, being of sufficient length to prevent its removal from the rack under normal conditions. The master card is normally retained against the rear wall of the rack by suitable clips 80 (FIG. 2). When it is necessary to utilize the master card, the same may be moved to the left and thus withdrawn from beneath the clips 80. Preferably, this master card is formed with cams 46 arranged to provide a program of fabric treatments most likely to suit the average user for every day purposes, as distinguished from program card cam arrangements providing for special programs of treatments.

Where a master card 32 is provided and retained positioned in the rack at the right-hand end thereof, it is necessary to provide a notch in the lower edge of the card, as at 81, so that the forward terminal portion of the latch 66 may project forwardly of the master card for engagement by the right-hand end of any other selected card being utilized, to release the latch 66 upon completion of a program controlled by such other card.

While the invention has been shown in but one form, it will be obvious to those skilled in the art that it is not so limited, but is susceptible of various changes and modifications without departing from the spirit thereof.

What is claimed is:

1. Control mechanism for providing a selected one of a plurality of selectable programs of apparatus operations, said mechanism comprising a bank of switches for selectively effecting the controlling action of said mechanism, supporting structure including a rear wall and side walls defining a recess, said rear wall having an opening therein in which said bank of switches is mounted, cam followers disposed in said recess and associated with said switches to operate the latter, a rack for holding a selected one of a plurality of program cards, each of which carries a plurality of cams, a selected program card held by said rack, means pivotally mounting said rack adjacent an end thereof within said recess for limited pivotal movement toward and away from said cam followers and associated switches, a motor, means driven by said motor for moving said selected program card longitudinally in said rack with the cams of said card engaging said cam followers, a line switch for the control mechanism, manually operable means for pivoting said rack toward said cam followers for engagement of said followers by the cams of the selected card held by said rack and for simultaneously closing said line switch to initiate a program of fabric treatments, and means for automatically moving said rack away from said cam followers for disengagement of said followers by the cams of said card and for simultaneously opening said line switch to terminate said program of apparatus operations.

2. Control mechanism for providing a selected one of a plurality of selectable programs of apparatus operations, said mechanism comprising a bank of switches for selectively effecting the controlling action of said control mechanism, supporting structure including a wall, said wall having an opening therein in which said bank of switches is mounted, cam followers associated with said switches to operate the latter, a rack for holding a selected one of a plurality of program cards, each of which carries a plurality of cams, a selected program card held by said rack, means mounting said rack for limited movement toward and away from said cam followers and associated switches, a motor, means driven by said motor for moving said selected program card longitudinally in said rack with the cams of said card engaging said cam followers, manually operable means for moving said rack toward said cam followers for engagement of said followers by the cams of the selected card held by said rack and to render operative the motor-driven card-moving means to initiate a program of apparatus operations, and means operated by the card when it reaches the end of its longitudinal movement in the rack for automatically moving said rack away from said cam followers for disengagement of said followers from the cams of said card and for rendering inoperative the motor-driven card-moving means to terminate said program of apparatus operations.

3. Control mechanism for providing a selected one of a plurality of selectable programs of apparatus operations, said mechanism comprising a bank of switches for selectively effecting the controlling action of said mechanism, cam followers associated with said switches to operate the latter, a rack for holding a selected one of a plurality of program cards, each of which carries a row of teeth and a plurality of cams, a selected program card held by said rack, means pivotally mounting said rack adjacent an end thereof for limited pivotal movement toward and away from said cam followers and associated switches, a timer and escapement motor, said motor including an output shaft, a peripherally-toothed gear secured on said shaft and drivingly engageable with the row of teeth on said card for moving the latter longitudinally within said rack with the cams of said card engaging said cam followers, a line switch for the control mechanism, manually operable means for pivoting said rack toward said cam followers for engagement of said followers by the cams of the selected card held by said rack and to mesh the teeth of said card with the teeth of said gear while simultaneously closing said line switch to initiate a program of apparatus operations, and means for moving said rack away from said cam followers for disengagement of said followers by the cams of said card and to disengage the teeth of said card from the teeth of said gear while simultaneously opening said line switch to terminate said program of apparatus operations.

4. Control mechanism for providing a selected one of a plurality of selectable programs of apparatus operations, said mechanism comprising a bank of switches for selectively effecting the controlling action of said mechanism, supporting structure including a rear wall, said rear wall having an opening therein in which said bank of switches is mounted, cam followers associated with said switches to operate the latter, a rack for holding a selected one of a plurality of program cards, each of which carries a plurality of cams, a selected program card held by said rack, means mounting said rack for movement between an inoperative position in which the cams of the card held thereby are out of engagement with the cam followers and an operative position in which said cams engage said cam followers, said rack having an opening through which said selected program card may be placed in said rack at one end thereof and moved longitudinally toward the other end thereof to a program starting position while the rack is in its inoperative position, motorized means operative when the rack is in its operative position for moving the selected program card longitudinally in said rack with the cams of the card engaging the cam followers, a line switch for the control mechanism, manually operable means for moving said rack from its inoperative position to its operative position and for closing said line switch to initiate a program of apparatus operations, and means effective when the card reaches the end of its longitudinal movement in the rack for moving said rack from its operative position to its inoperative position and for opening the line switch to terminate the program of apparatus operations.

References Cited in the file of this patent

UNITED STATES PATENTS 2,912,532 Jennings -------------- Nov. 10, 1959